United States Patent [19]

Norman

[11] Patent Number: 4,815,569

[45] Date of Patent: Mar. 28, 1989

[54] BRAKE MECHANISM FOR A CREEPER

[75] Inventor: Robert A. Norman, Bristol, Wis.

[73] Assignee: Lisle Corporation, Clarinda, Iowa

[21] Appl. No.: 86,383

[22] Filed: Aug. 17, 1987

[51] Int. Cl.⁴ .................................................. B60T 1/14

[52] U.S. Cl. ........................................ 188/5; 254/422; 280/32.6

[58] Field of Search ............................... 188/5, 6, 7, 8; 280/32.6; 254/418, 422

[56] References Cited

U.S. PATENT DOCUMENTS

| | | | |
|---|---|---|---|
| 1,177,340 | 3/1916 | Klein | 254/422 X |
| 1,349,941 | 8/1920 | Broome | 188/5 X |
| 1,385,877 | 7/1921 | McDonald | 188/6 |
| 2,456,002 | 12/1948 | Jonette | 188/8 X |
| 3,313,377 | 4/1967 | Aninger | 188/5 |
| 3,361,437 | 1/1968 | Loftis | 5/434 X |
| 4,043,566 | 8/1977 | Johnson | 280/87.04 A |
| 4,066,151 | 1/1978 | Liebscher et al. | 188/5 |
| 4,168,076 | 9/1979 | Johnson | 280/11.2 |
| 4,244,594 | 1/1981 | Hines | 188/5 X |

FOREIGN PATENT DOCUMENTS

| | | | |
|---|---|---|---|
| 30281 | 2/1904 | Switzerland | 188/8 |

*Primary Examiner*—George E. A. Halvosa
*Attorney, Agent, or Firm*—Allegretti & Witcoff, Ltd.

[57] ABSTRACT

The brake construction is comprised of first and second U-shaped leg means which are pivotally attached to the bottom surface of the creeper platform and interconnected by means of a tie rod. A manually operated handle is attached to one of the leg means to effect pivoting motion of both leg means between a brake engagement position and a brake release position. When the leg means are in the brake engagement position, they define a generally divergent angle which tends to lock the brake construction in the brake engagement position.

5 Claims, 2 Drawing Sheets

BRAKE MECHANISM FOR A CREEPER

BACKGROUND OF THE INVENTION

This invention relates to an improved brake mechanism or brake device for use in combination with a workman's creeper.

Heretofore workmen have utilized a creeper, which comprises a platform supported on casters, when repairing vehicles and the like. It has been found desirable to provide some type of brake mechanism to maintain the creeper fixed in a position desired by a workman. Previously issued patents have disclosed various brake constructions for creepers. Loftis in U.S. Pat. No. 3,361,437 discloses a brake for a creeper which operates in conjunction with the headrest associated with the creeper. Hines in U.S. Pat. No. 4,244,594 discloses a brake device comprised of a resilient strip mounted on the bottom surface of a creeper. The strip engages the ground to effect a braking action.

While these devices appear to be workable and clearly suggest that a brake construction is desirable in combination with a creeper, there has remained a need for an improved creeper brake construction.

SUMMARY OF THE INVENTION

Briefly the present invention comprises an improved brake construction in combination with a creeper of the type including a generally rectangular platform supported on casters. The brake construction is comprised of first and second U-shaped leg means which are pivotally attached to the bottom surface of the creeper platform and interconnected by means of a tie rod. A manually operated handle is attached to one of the leg means to effect pivoting motion of both leg means between a brake engagement position and a brake release position. When the leg means are in the brake engagement position, they define a generally divergent angle which tends to lock the brake construction in the brake engagement position.

Thus, it is an object of the invention to provide an improved creeper brake construction which is manually operable.

It is a further object of the invention to provide an inexpensive creeper brake construction which provides a positive braking action as well as brake release position to permit easy movement of the creeper.

Yet another object of the invention is to provide a creeper brake construction comprised of a pair of associated legs connected by a tie rod and operable by a manual handle.

Yet another object of the invention is to provide a creeper brake construction which may be easily incorporated with present day creeper constructions.

These and other objects, advantages and features of the invention will be set forth in the detailed description which follows.

BRIEF DESCRIPTION OF THE DRAWING

In the detailed description which follows, reference will be made to the drawing comprised of the following figures.

DESCRIPTION OF THE PREFERRED EMBODIMENT

Figure 1:
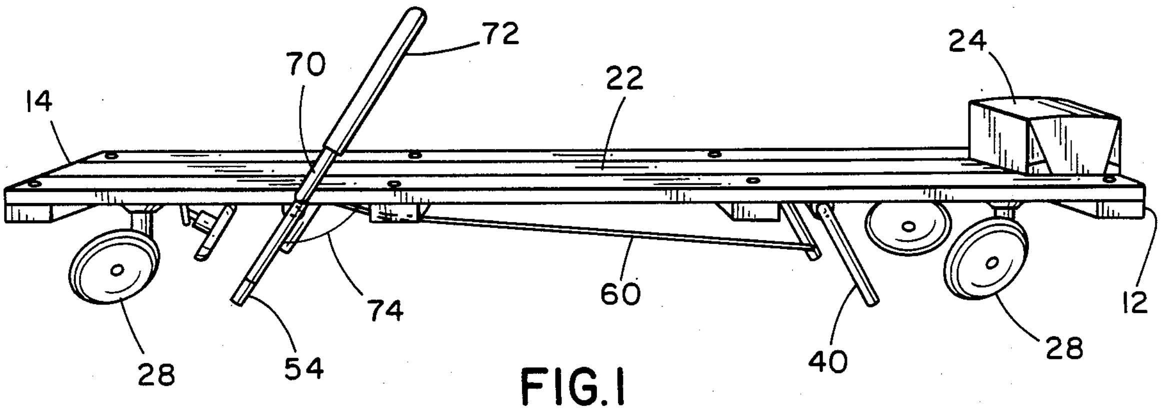
FIG. 1 is a perspective view of the improved creeper.
Figure 2:
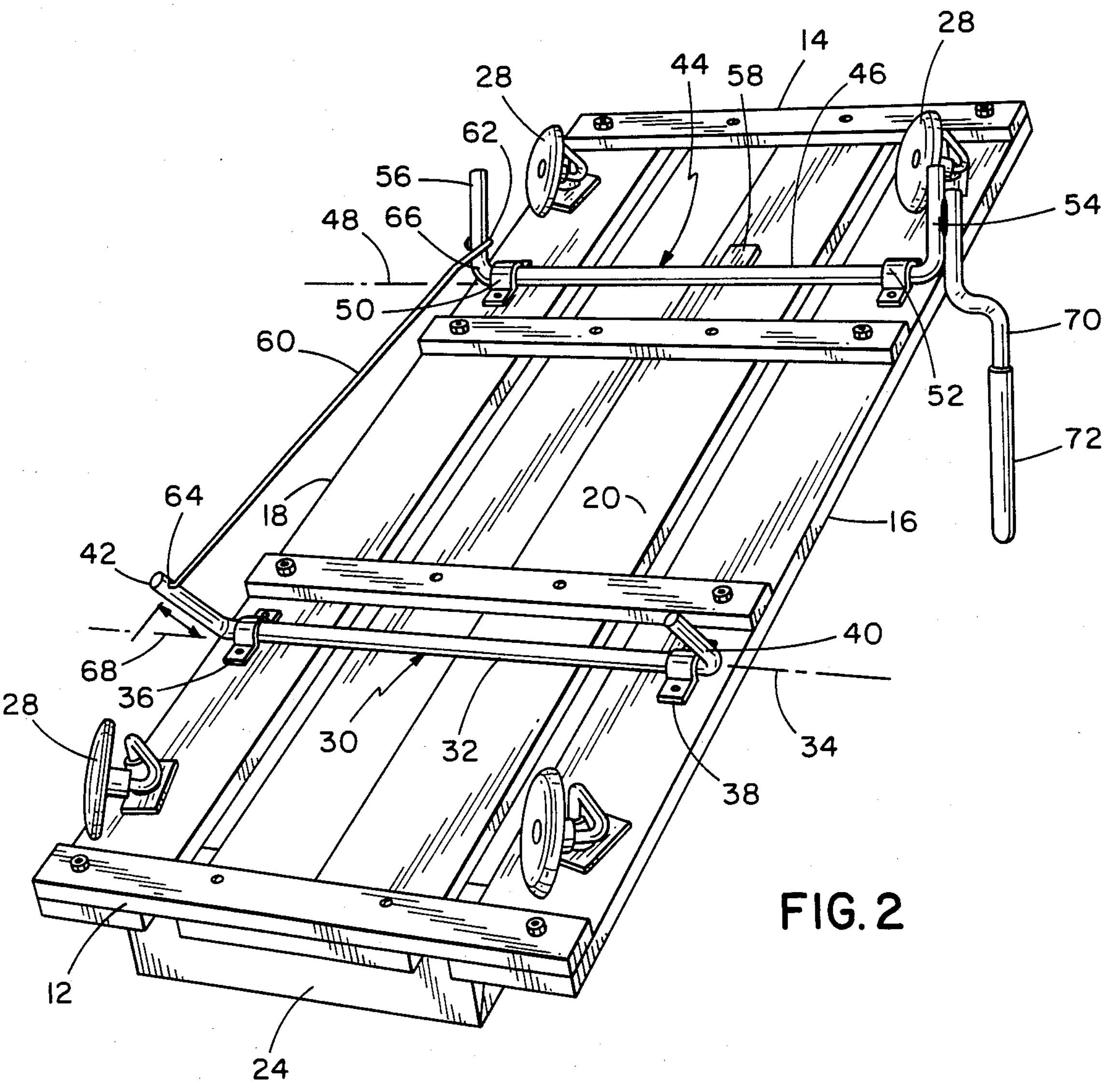
FIG. 2 is a perspective view of the underside of the creeper of FIG. 1.
Figure 3:
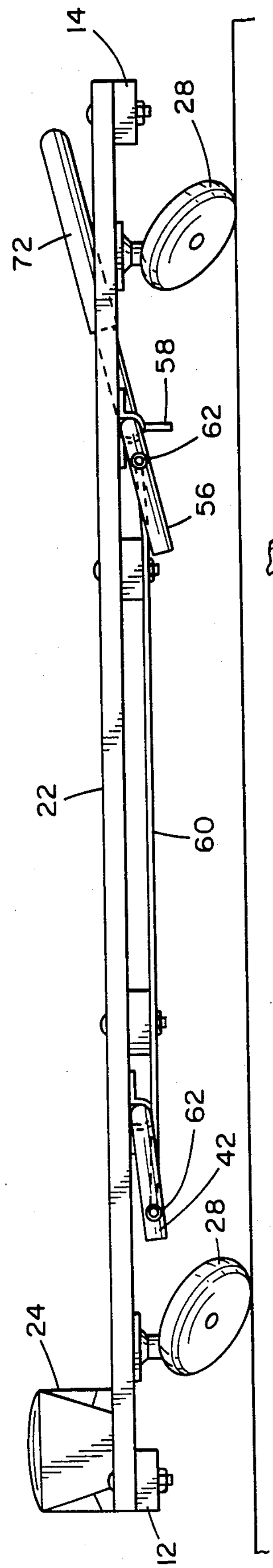
FIG. 3 is a side view of the creeper with the brake disengaged.
Figure 4:
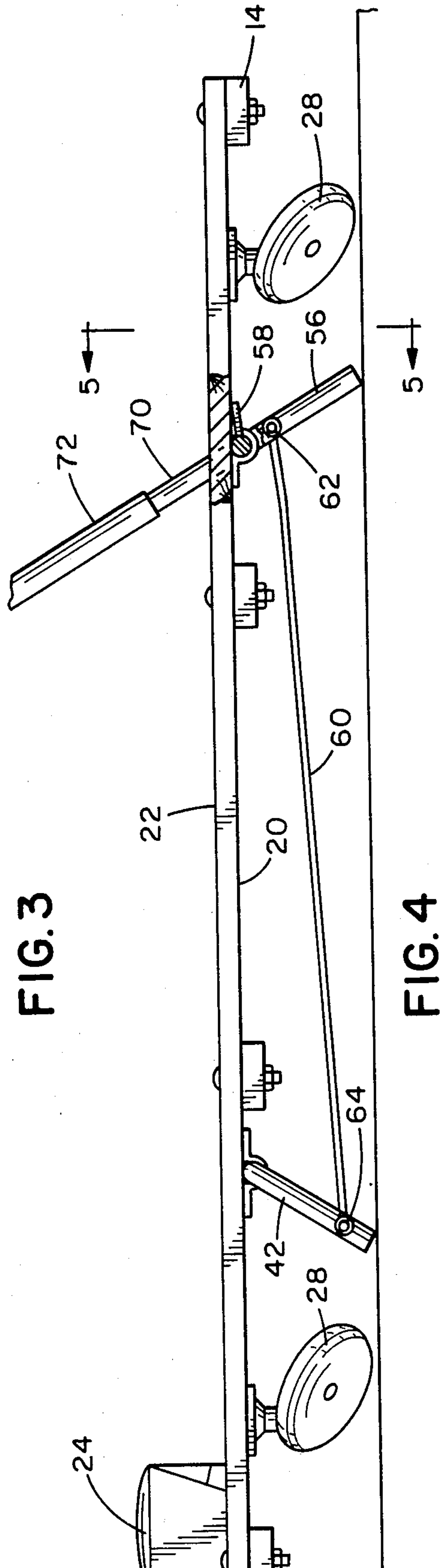
FIG. 4 is a side view of the creeper with the brake engaged.
Figure 5:
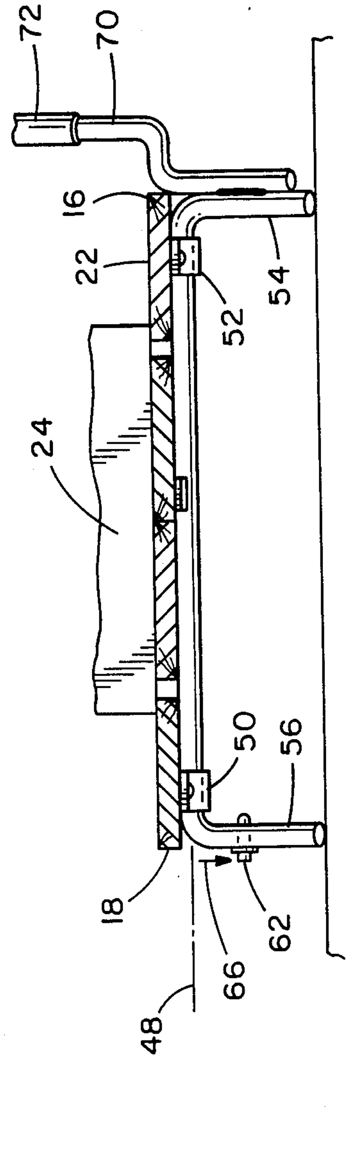
FIG. 5 is an end view of the creeper shown in FIG. 4.

In the figures, like numbers refer to like parts of the improved creeper and brake construction of the present invention. Referring to the figures, the creeper of the present invention is comprised of a platform 10 having a head end 12, a foot end 14 and opposite sides 16 and 18. Platform 10 is further defined by a bottom surface 20 and a top surface 22. A head rest 24 is positioned at the top end 12. A longitudinal axis 26 extends between the top end 12 and bottom end 14. Casters 28 are affixed to the bottom surface 20 at each of the corners of the platform 10. The construction thus described constitutes a typical creeper or workman's platform typically used by mechanics and auto repairmen to facilitate their access to the underside of an automobile chassis. The remainder of the description relates to the improved brake construction as combined with such a typical creeper.

The brake construction is comprised of a first leg means 30 which is defined by a U-shaped rod or tube. Leg means 30 thus includes a central shaft 32 which extends along a axis 34 generally transverse to longitudinal axis 2 and which is pivotally mounted by means of clamps 36 and 38 onto the bottom surface 20 of the platform 10. The shaft 32 has radial legs 40 and 42 extending from its opposite ends. The legs 40 and 42 are of generally equal length and are spaced a distance approximately equal to the width of the platform 10. The legs 40 and 42 extend radially from the axis 34 for a distance which is equal to and preferably slightly greater than the distance which the casters 28 support the bottom surface 20 above ground level.

A second leg means 44 is constructed in similar fashion to the first leg means 30 and is thus comprised of a U-shaped rod or tube. The second leg means 44 includes a central pivot shaft 46 which pivots about an axis 48 and is attached to the bottom surface 20 by means of clamps 50 and 52. Legs 54 and 56 project radially from the shaft 46 and thus radially from the axis 48. The legs 54 and 56 are of substantially equal length and are spaced by the shaft 46 a distance substantially equal to the width of the platform 10. The length of the legs 54 and 56 is substantially equal to or greater than the distance which the casters 28 support the bottom surface 20 above ground level. The shaft 46 defines an axis 48 transverse to the axis 26. Axis 48 and axis 34 are thus generally parallel. Legs 54, 56 are approximately equal in length to legs 40 and 42.

A stop member or tab 58 is welded to the midpoint of the shaft 46 and limits the rotation of the shaft 46 inasmuch as the stop member 58 engages against the bottom surface when rotated to a clockwise or counterclockwise limit. Thus, stop member 58 limits the rotation of the shaft 46 and attached legs 54 and 56 in both directions.

A tie rod 60 is pivotally attached at its opposite ends 62 and 64 to legs 56 and 42, respectively. The pivot attachment at end 62 to leg 56 is defined by a radius 66 which is preferably less than the radius 68 of attachment end 64 to leg 42.

A handle assembly which comprises a generally linear rod 70 is attached to the leg 54. Rod 70 extends above bottom surface 20 and includes a grip 72 so that it may be manually gripped. Thus, the rod 70 may be actuated to move the leg 54 through an angle of rotation 74 about axis 48. The limits to the angle of rotation 74 due to operation of rod or handle 70 are determined by the stop 58, whereas tie rod 60 insures the leg means 30, 44 move or pivot in unison.

In operation, when the brake mechanism is in the non-engaged position, the handle 70 is rotated so as to position leg 54 and thus leg 56 generally flush against the bottom surface 20. The legs 54 and 56 thus may serve to act as a stop with respect to the amount of rotation of shaft 46. Alternatively, the stop 58 may be attached to either shaft 46 to limit the amount of rotation. Still further yet, another stop (not shown) may be included on shaft 46 or shaft 32 to control the amount of rotation effected by operation of handle 70.

As the handle 70 rotates the shaft 46, tie rod 60, which connects leg 56 to leg 42, will effect a similar rotation of the leg means 30. Thus, when the handle 70 is rotated to position the legs 54 and 56 out of engagement with ground level, the legs 40 and 42 are likewise disengaged from ground level. The relative travel of the legs 40 and 42 is dependent upon the radii or radial distances 66 and 68. These radial distances 66, 68 also impart a mechanical advantage to the rotation of the leg means 30, 44 and as disclosed have the effect of providing for less rotation of legs 40 and 42 than is imparted to legs 54 and 56 upon pivoting action effected by the handle 70. In other words, since the radius 66 is less than radius 68, the amount of rotation of legs 40 and 42 is effectively less than the amount of rotation of legs 54 and 56. However, the radii 66, 68 may be varied to effect equal relative rotation of the leg means 30, 44 or any variety of relative rotations of leg means 30 relative to leg means 44.

When the brake is placed in the operative or engaged position, the handle 70 is pivoted so as to pivot the second leg means 44 about shaft 46 to engage with the ground level. It will be noted that the plane formed by the legs 54, 56 and shaft 46 forms a generally divergent angle with a plane formed by shaft 32 and legs 40, 42. Thus the legs 54 and 56 diverge with respect to the legs 40 and 42. The divergent relationship of legs 54, 56 relative to legs 40, 42 is effected by virtue of the length of tie rod 60 and extent of radii 66, 68 connecting the legs. Generally, tie rod 60 is longer than the spacing of axes 34, 48 to effect leg divergence. If the length of tie rod 60 is less than the spacing of axes 34, 48, convergence of the leg means 30, 44 is effected.

This described construction effects locking of the brake and thus the creeper in a generally fixed position. The divergence of the legs is enhanced by the weight of a person on the platform 10 effects maintenance of the brake in a locked position. Of course, the same effect could be achieved, though perhaps to a lesser extent, if the legs formed a convergent angle with one another. Such convergence could be achieved through appropriate length and attachment of tie rod 60.

The preferred embodiment is as described with a divergent angle defined by the leg means 30, 44 when in the locking position. Again it is noted that the tie rod 60 is constructed so as to ensure maintenance of the divergent or convergent angle and also so as to ensure appropriate travel of the leg means 30, 44 about their respective axes and relative to one another. The position of stop 58 also impacts on the maintenance of the brake in the locked or released position. Stop 58 is preferably positioned to limit rotation of shaft 46 to the brake engagement position. Stop 58 could be eliminated from the construction, but it is preferred to include stop 58.

Various alterations of the construction are thus possible while still being in the spirit and scope of the invention. For example, the legs may be divergent rather than convergent as described above. The attachment of the handle 70 or stop 58 to one or the other of the leg means 30, 44 is possible. The number of legs and their interconnection may be altered or changed. The shape of the legs and their position for engagement with the ground may be altered. The invention is therefore to be limited only by the following claims and their equivalents.

What is claimed is:

1. In a creeper of the type including a generally rectangular platform supported on casters, said platform including a bottom surface, a head end, a foot end, first and second opposite sides with a generally longitudinal axis from one end to the other, the improvement comprising, in combination:

a manual brake construction, said brake construction including:

(a) a first leg means including a first leg member extending radially from a first axis transverse to the longitudinal axis, said first leg member pivotally mounted on the bottom surface of the platform and having a length greater than the distance the bottom surface is supported by the casters above the ground;

(b) a second leg means including a second leg member extending radially from a second axis also transverse to the longitudinal axis and spaced from the first axis, said second leg member pivotally mounted on the bottom surface of the platform and having a length greater than the distance the bottom surface is supported by the casters above the ground;

(c) manually operable handle means comprising an integral extension of a leg member and projecting at one side of the platform above the bottom surface for manual access at all times to manually pivot the connected leg member about its axis; and (d) a tie rod pivotally connected at its opposite ends to leg members at pivot points intermediate points defined by the axis of each leg member and the distal end of each leg member, the length of the tie rod relative to the separation of the first and second axis and the pivotal tie rod connections defining means whereby the manual actuator is operative to pivot its connected leg member between a non-braking position generally parallel with the longitudinal axis and the other of said leg members and a braking position generally transverse to the longitudinal axis and thereby simultaneously pivot the other leg member between generally coincidental positions, said length of the tie rod connection to said respective legs being greater then the spacing of said axes of said legs, said leg members defining a generally divergent angle relative to each other when extended to the braking position, and said tie rod being attached to the first leg member at a lesser radial distance than the connection of the tie rod to the second leg member from their respective axes.

2. The improvement of claim 1 including a pivot stop attached to at least one leg means for engaging the platform and limiting the pivotal travel of the leg means.

3. The improvement of claim 1 wherein the first leg means comprises one tubular piece formed into two legs radially extending from the axis of a central shaft portion interconnecting the legs.

4. The improvement of claim 3 wherein the second leg means comprises one tubular piece formed into two legs radially extending from the axis of a central shaft portion interconnecting the two legs.

5. The improvement of claims 1, 2, or 3 including a stop attached to the leg means operated by the handle for limiting travel of the leg means to the locked position.

* * * * *